United States Patent
Martens et al.

(10) Patent No.: US 8,689,418 B2
(45) Date of Patent: Apr. 8, 2014

(54) TURNING MACHINE

(75) Inventors: Olaf Martens, Donzdorf (DE);
Sieghard Kälber Er, Uhingen (DE)

(73) Assignee: Mag IAS GmbH, Goppingen (DE)

( * ) Notice: Subject to any disclaimer, the term of this patent is extended or adjusted under 35 U.S.C. 154(b) by 120 days.

(21) Appl. No.: 13/131,650

(22) PCT Filed: Dec. 1, 2009

(86) PCT No.: PCT/EP2009/066148
§ 371 (c)(1),
(2), (4) Date: Aug. 9, 2011

(87) PCT Pub. No.: WO2010/063716
PCT Pub. Date: Jun. 10, 2010

(65) Prior Publication Data
US 2011/0290089 A1    Dec. 1, 2011

(30) Foreign Application Priority Data

Dec. 3, 2008  (DE) .......................... 10 2008 060 297

(51) Int. Cl.
*B23B 3/22*    (2006.01)
(52) U.S. Cl.
USPC ....................... 29/27 C; 29/40; 29/50; 82/121
(58) Field of Classification Search
USPC ........ 29/27 C, 27 R, 27 A, 40, 50, 52, 53, 54, 29/55; 82/121, 159, 129; 483/18
See application file for complete search history.

(56) References Cited

U.S. PATENT DOCUMENTS

| | | | | |
|---|---|---|---|---|
| 4,596,502 | A * | 6/1986 | Cattani | 409/231 |
| 5,392,502 | A * | 2/1995 | Freer | 29/52 |
| 5,490,307 | A * | 2/1996 | Link | 29/27 C |
| 5,765,456 | A * | 6/1998 | Grossmann | 82/1.11 |
| 5,964,016 | A * | 10/1999 | Ito et al. | 29/27 C |
| 7,013,543 | B2 * | 3/2006 | Iwabuchi et al. | 29/27 C |
| 7,137,939 | B2 * | 11/2006 | Ueda | 483/27 |
| 7,367,097 | B2 * | 5/2008 | Nakamura et al. | 29/27 C |
| 7,448,304 | B2 * | 11/2008 | Kikuchi et al. | 82/124 |
| 7,506,423 | B2 * | 3/2009 | Iwabuchi et al. | 29/27 C |
| 7,509,720 | B2 * | 3/2009 | Wawrzyniak | 29/40 |
| 2006/0112671 | A1 * | 6/2006 | Blase et al. | 59/78.1 |
| 2007/0251360 | A1 | 11/2007 | Akiyama | |

FOREIGN PATENT DOCUMENTS

| | | |
|---|---|---|
| DE | 3000295 | 7/1981 |
| DE | 3603612 A1 * | 8/1987 |
| DE | 4236866 A1 * | 5/1994 |
| DE | 10012445 | 9/2001 |
| DE | 10213778 | 10/2003 |

(Continued)

*Primary Examiner* — Daniel Howell
*Assistant Examiner* — Nicole N Ramos
(74) *Attorney, Agent, or Firm* — Head, Johnson & Kachigian, P.C.

(57) ABSTRACT

Instead of a conventional slide arrangement Z/X/Y and a B-axis that is pivotable thereon, a more compact and less complex configuration is achieved in that a tool support that is pivotable about the B-axis is directly placed onto the X-slide and only a single rotationally drivable tool spindle is additionally movable in Y-direction in this pivotable tool support, whereas all other tool receivers for stationary tools are fixated at the support.

22 Claims, 11 Drawing Sheets

(56) References Cited

FOREIGN PATENT DOCUMENTS

Figure 1A:
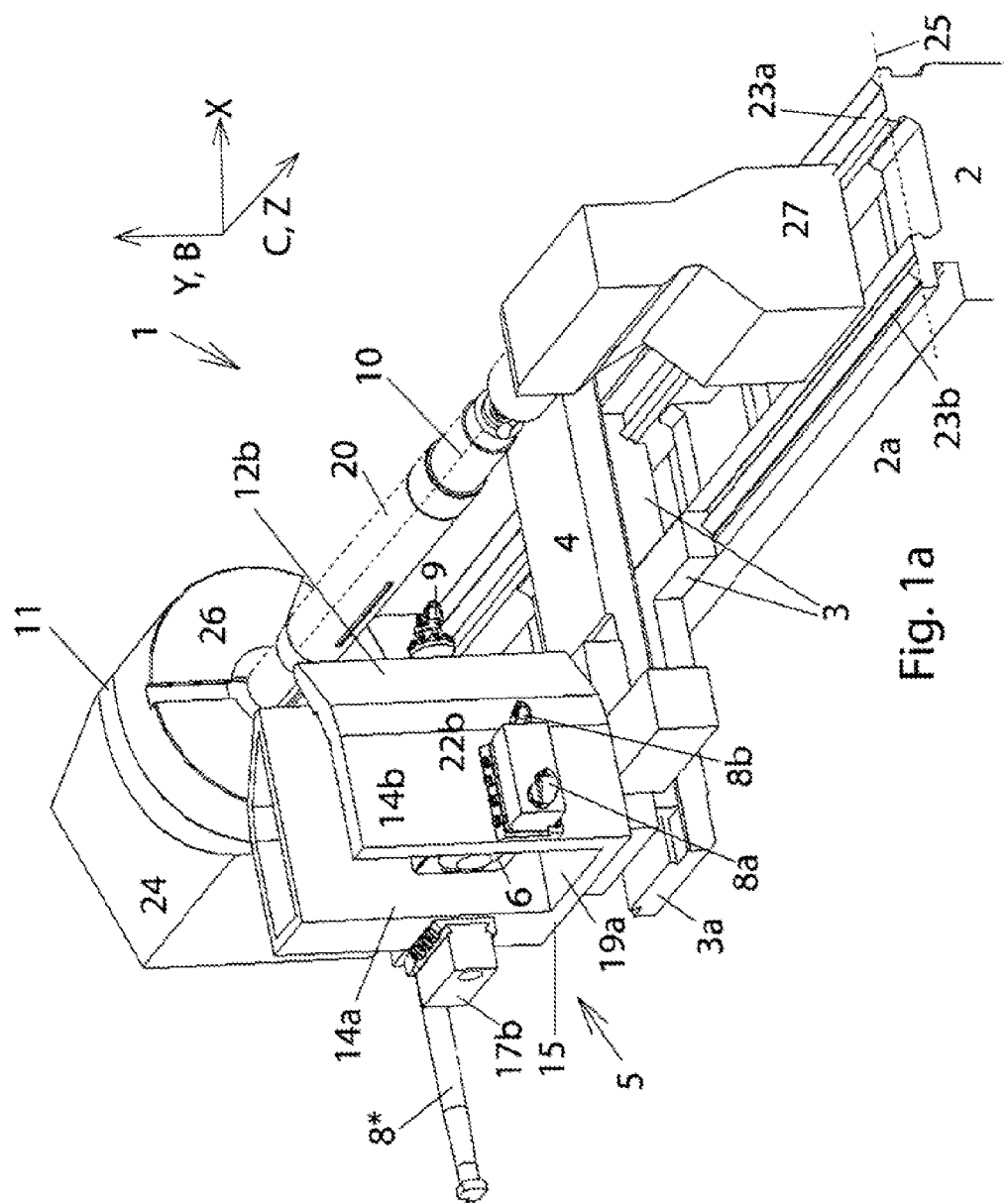

| | | |
|---|---|---|
| DE | 10213778 A1 * | 10/2003 |
| DE | 10354395 | 5/2005 |
| DE | 102005009893 | 9/2006 |
| DE | 202008006667 | 7/2008 |
| EP | 0538515 | 4/1993 |

* cited by examiner

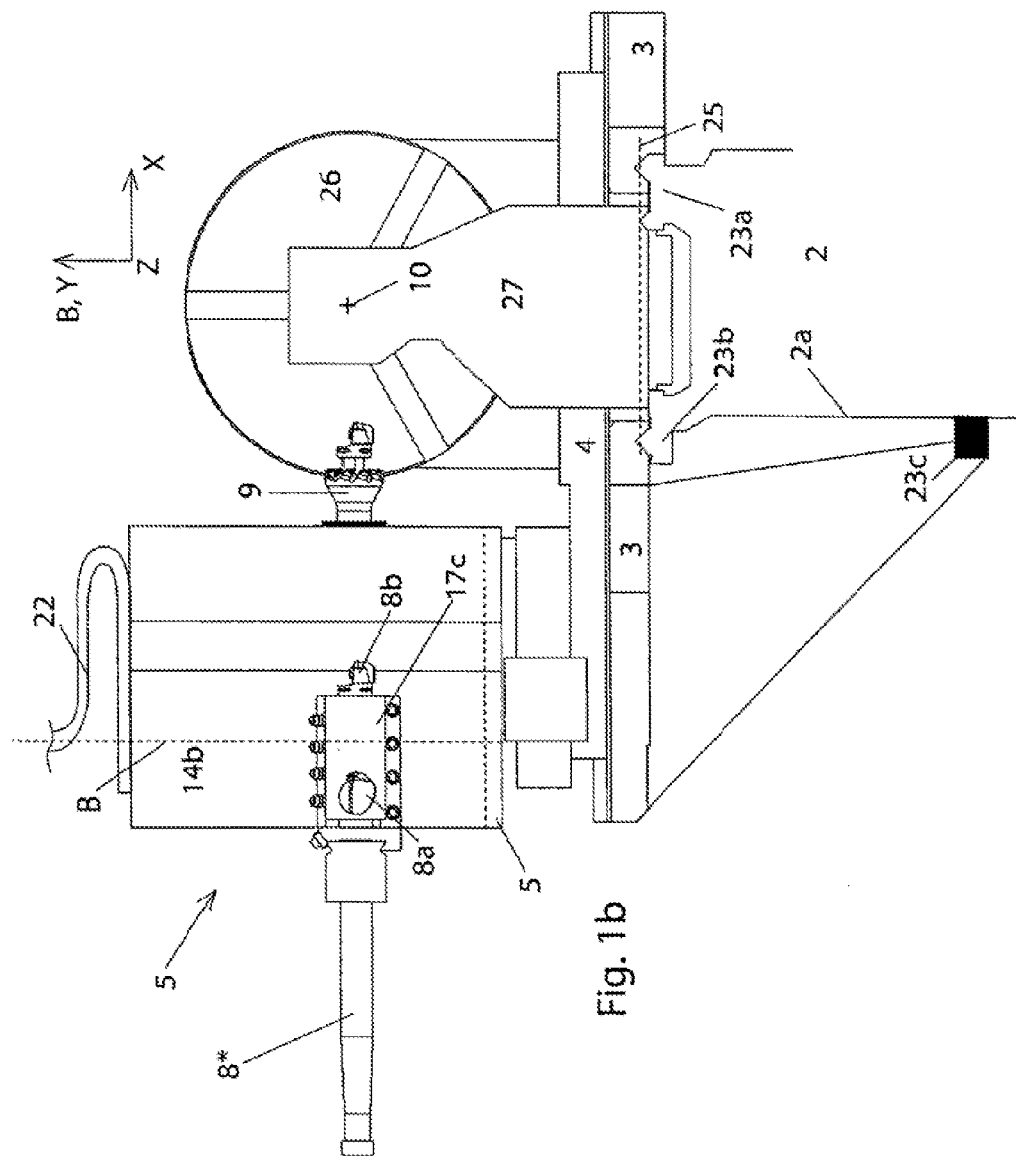

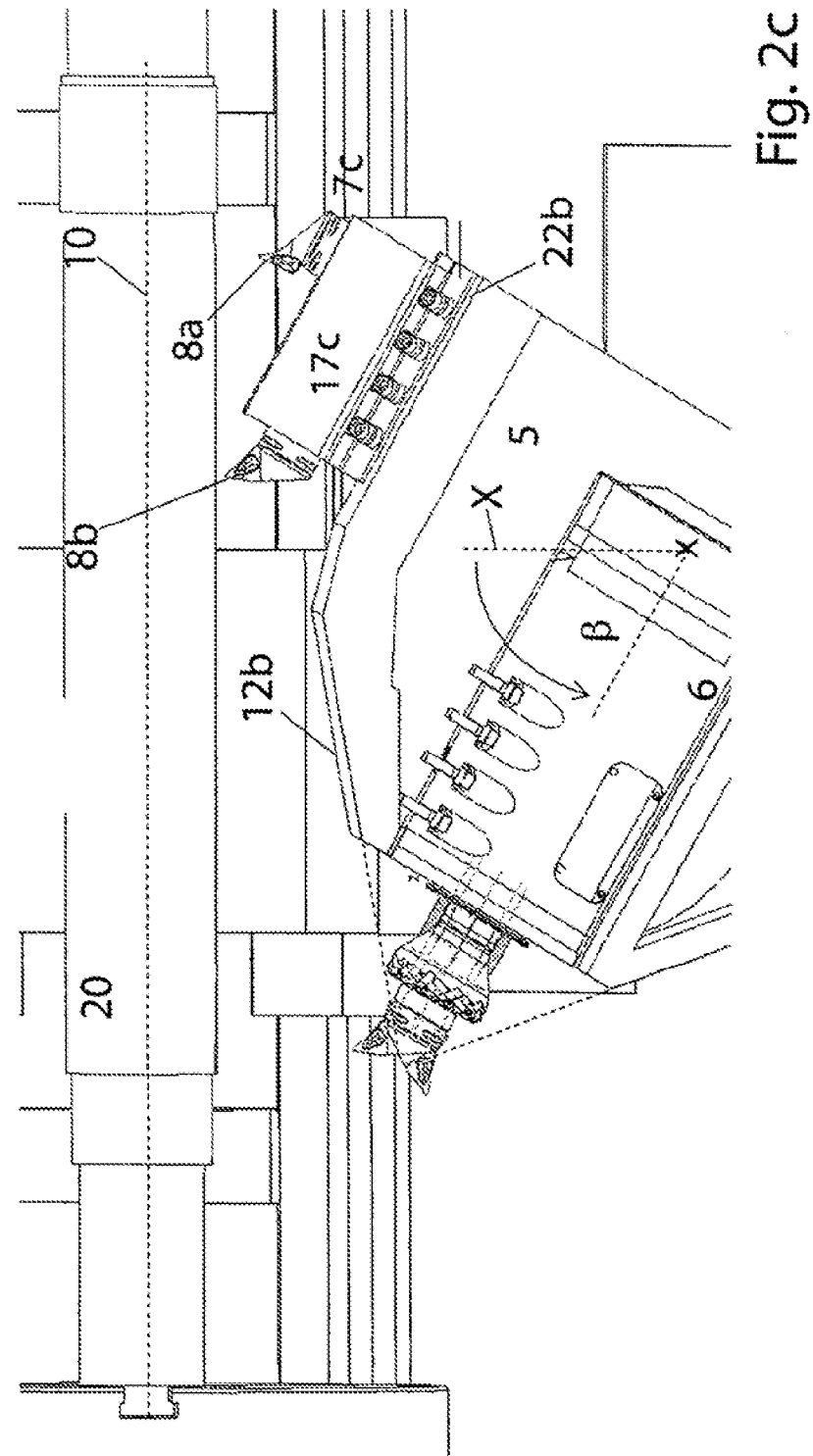

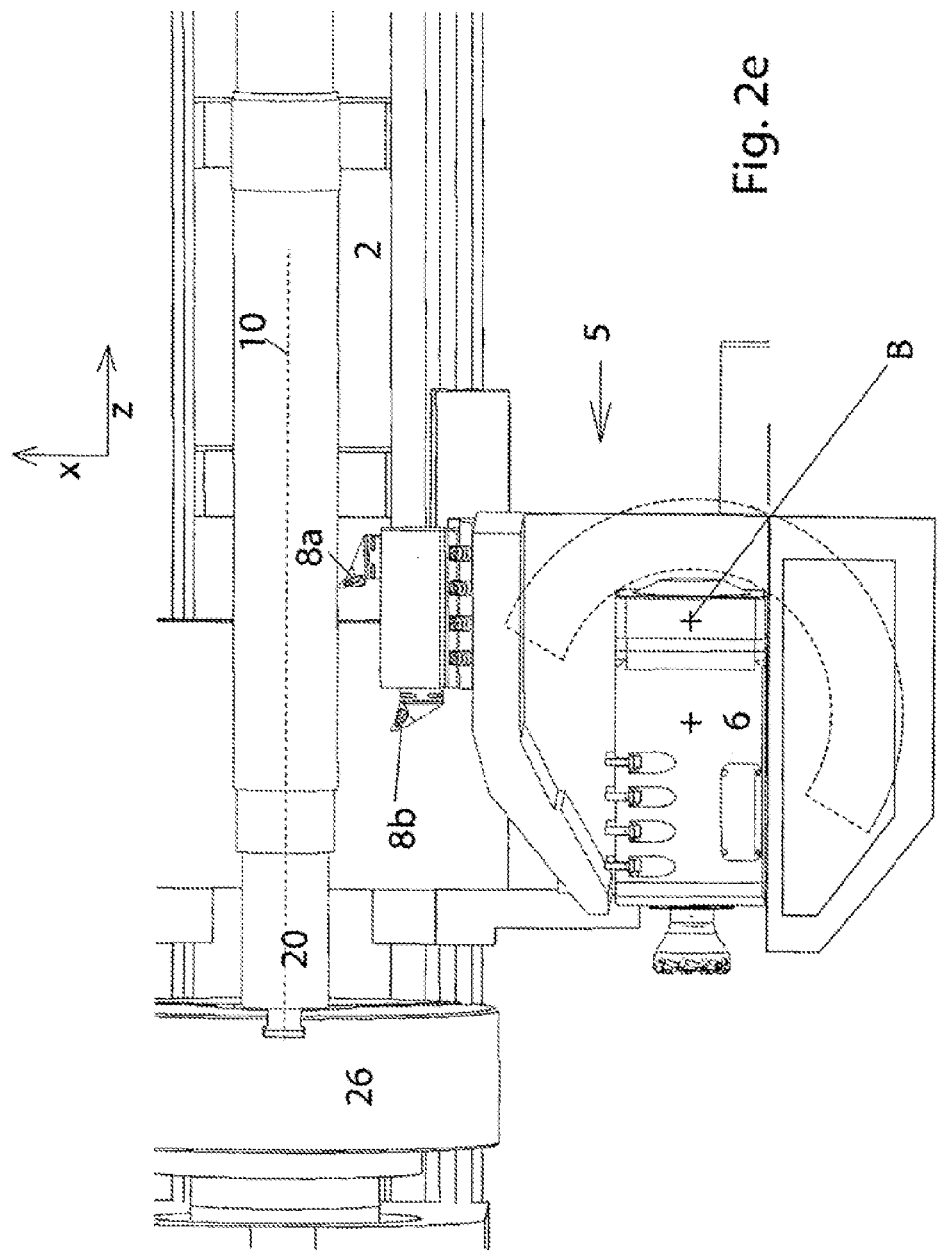

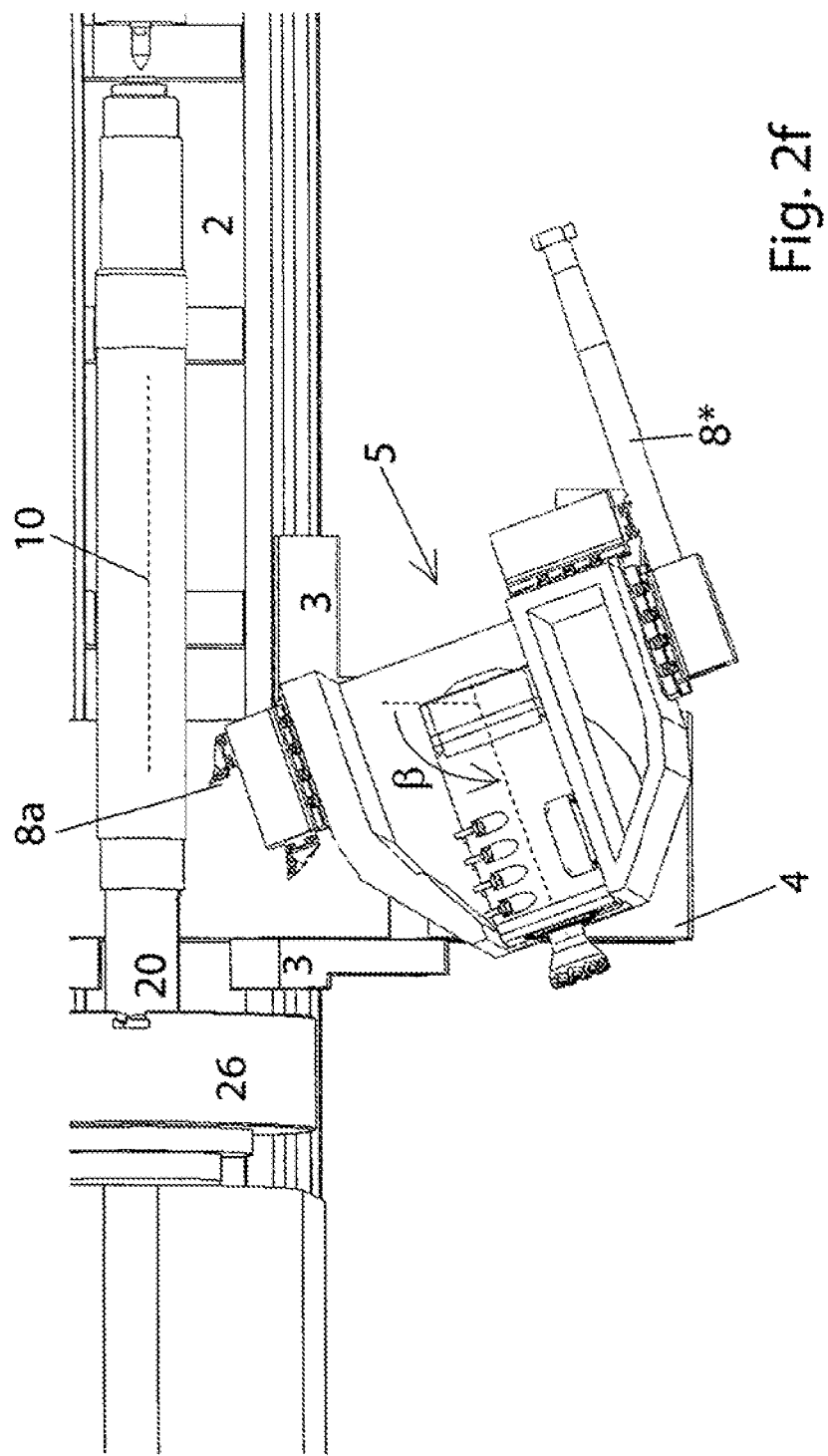

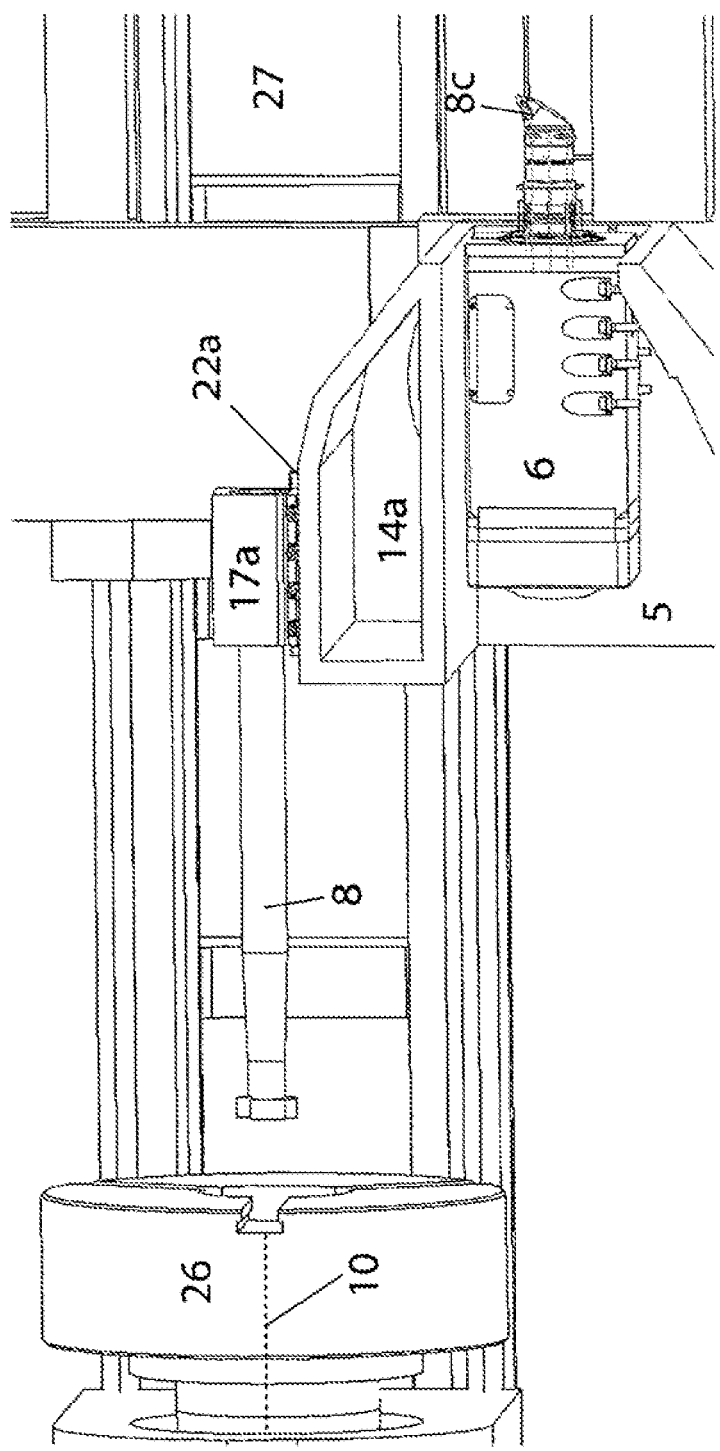

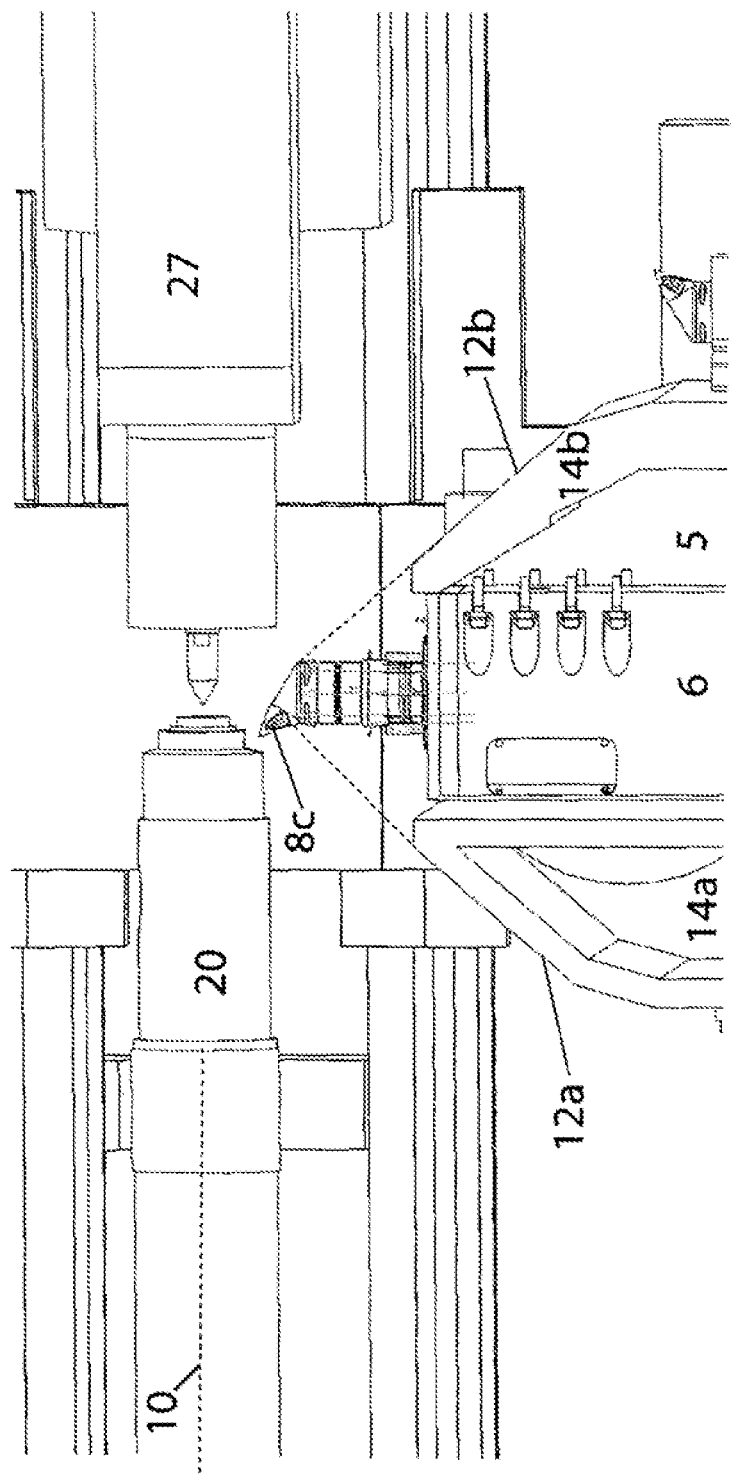

TURNING MACHINE

I. FIELD OF THE INVENTION

The invention relates to turning machines.

II. BACKGROUND OF THE INVENTION

Turning machines are primarily used for producing rotation symmetrical work pieces, in that a turning steel is run along the work piece in an engaging manner, wherein the work piece is driven about a C-axis in rotation, and thus the turning steel is run in x-direction for so-called face turning or moved in z-direction for so-called longitudinal turning.

In order to also be able to perform non-rotation symmetrical processing at turned components of this type in the same clamping step in this turning, if is known to not only attach stationary tools, like e.g. turning tools, at the tool support but also tools that are configured to be driven in rotation like drills and mills which are inserted into a tools spindle at the tool support and which are driven in rotation.

Since a rotational position of a fixated work piece is additionally adjustable through a controlled C-axis of the work piece spindle, milling can be performed at any location of the circumference of the work piece, e.g. through a driven mill or transversal bore holes can be introduced typically when the work piece is standing still.

For this purpose, at least the tool spindle that is drivable in rotation has to be movable in addition to a first transversal direction in a second transversal direction relative to the rotation axis, thus the Y-direction.

In this context, it is known to place a Y-slide on the X-side of the tool support, wherein the Y-slide carries the tool spindle.

Typically, tool holders for rotating and also for stationary tools can be inserted into the tool spindle that can be drivable in rotation and also still standing, so that milling, drilling or also turning operations can be performed through the same tool receiver.

Typically a tool revolver is used as a tool support, wherein the tool revolver includes plural tool receivers, wherein some tool receivers are configured for receiving tools that are drivable in rotation through a rotational drive, wherein other tool receivers are configured for receiving stationary turning tools.

The technical complexity, however, for a tool revolver with its plural tool receivers is rather high and the usability is limited in that the tool revolver is typically only shiftable into rotational positions, where the desired tool receiver protrudes in the direction of the rotational center, but not in intermediary positions.

However, when the complexity for a tool revolver shall be avoided and stationary and also driven tools shall be alternatively inserted into the same tool receiver, also this has the disadvantage, that the machining forces imparted upon the tool are also imparted upon the rotationally supported tool spindle, even when the work piece is machined with stationary tools, so that the machining forces load the bearings of the tools spindle, even when no driven tools are used, which even loads the bearing on one side which causes premature wear.

Another disadvantage is that when a Y-axis is provided typically the Y-slide sits directly on the X-slide, and the X-slide sits on the Z-slide, and optionally the tool receiver is configured pivotable on the Y-slide, e.g. about B-axis.

This, however, yields a configuration that is not compact, has a lot of overhang, and which is heavy, in particular not well-suited for conventional turning machines with a tool spindle, that is arranged horizontal, in for particular Z-supports which are arranged adjacent to one another in a horizontal support plane.

III. DETAILED DESCRIPTION OF THE INVENTION a) Technical Object

Thus, it is an object of the invention to provide a turning machine with a horizontal bed, which facilitates complete machining of work pieces including milling and drilling operations at a stationary work piece in one clamping step, in addition to turning operations, thus preferably with the fewest number of tool changes possible, in spite of a compact configuration for the tool support.

b) Solution

This object is achieved through a turning machine with the features of claimed 1. Advantageous embodiments can be derived from the dependent claims.

Since the Y-slide that supports the tools spindle is not arranged directly on the X-slide, but on the tool support that is pivotable, e.g. about the B-axis, wherein the tool support is supported on the X-slide, this yields a much more compact configuration of the entire tool unit. This is achieved in particular, in that the B-axis viewed in Y-direction, extends through the tool spindle, thus the rotation point of the pivotable tool support is arranged below the driven tools spindle.

The tool spindle that is movable in Y-direction is movable in particular in a linear manner along the tool support along Y-supports, but it can also be configured pivotable about the Z-direction.

The tool support that is pivotable about the B-axis, wherein the tool spindle is movable at the tool support, additionally supports additional tool receivers for stationary, thus non-driven tools, either turning tools or drilling rods.

Since the tool receivers for the stationary tools are positioned at fixated positions of the tool support, thus not movable in Y-direction, the complexity of the configuration is reduced since only the tool spindle for the driven tool has to be configured movable in Y-direction, so that only relatively small masses have to be moved in Y-direction.

The tool support that is rotatable about the B-axis includes at least one X-slide made from arms protruding in Y-direction and particular freely terminating on top, preferably two arms that are offset in parallel and adjacent to one another.

On the inside of the one arm which is oriented towards the other arm or on one of the exterior surfaces of the particular arm the Y-supports are arranged, along which the tools spindle is movable in Y-direction.

The distance between the arms is sized so that the tool spindle exactly fits there between.

When one arm is provided, and also when two offset arms are provided, the contour of the tool support in Y-direction is a contour that tappers into a point in forward direction towards to free end of the driven tool, wherein the tool arms in their front portions include two exterior surfaces standing at a slant angle relative to one another, wherein the intermediary angle is less than 90°, in particular 60° to 80°.

The two slanted surfaces do not contact each other due to the distance between the two arms, wherein the tool spindle is mounted in the gap between the two free front ends of the two arms far enough forward, so that a tool inserted therein that is drivable in rotation can reach and even cover the geometric intersection point of the two slanted surfaces.

One of the two arms is thus preferably configured as a hollow profile. The other arm, however, can be configured as a cambered plate-shaped solid component and on the outside of the solid arm oriented towards the other tail arm there are the Y-supports for the tool spindle. Preferably both arms are supported at a base-plate which is rotatably support about the B-axis on the X-slide.

The additional stationary tools for which one or plural receivers can be provided are arranged at the slanted surface of the arms, or also at the rear portion of the outer surfaces of the arms that extend preferably parallel to one another or also at the backside of one or both arms. Thus, the tools can be used so that they can protrude from the tool support parallel, at an angel or in opposite direction to the extension of the driven tool.

The tool support that is rotatable about the B-axis can thus be positioned in any rotation position, in particular automatically positioned within its pivot range, which is preferably ±80°, better ±90°, better ±100°, better ±110° with reference to its normal position in which the tool spindle is arranged at a right angle relative to the Z-axis.

The B-axis and also the Y-axis are numerically controlable by the control of the turning machine, thus NC-controlled.

The tool spindle is suited in particular for inserting stationary tools, in particular turning tools.

A drilling rod that is used as a stationary tool is arranged in particular on the outside of one of the arms in a direction parallel to the direction of the tool spindle, but so that it is oriented in the opposite direction at the rear end of the outer surface of one of the arms of the tool spindle.

The energy supply to the tools spindle is provided from the top side of the tool support and in particular from the top side of the turning machine. For this purpose, an arcuate energy chain is arranged in a horizontal plane, thus in a X-Z plane, for this purpose at the free upper end of the support, in particular of the freely terminating arm or arms, wherein data and or energy conductors are supplied in the energy chain.

Thus the angle range of the arcuate energy chain corresponds preferably to the pivot range of the tool support.

The turning machine preferably has a conventional configuration, thus with a horizontally arranged rotation axis and in particular with a bed in which the Z-supports are arranged adjacent to one another in a horizontal Z-support plane on the top side of the bed.

Since the X-slide due to the rotatable support and the Y-axis arranged thereon is significantly heavier than a conventional X-slide and also protrudes further beyond the bed of the turning machine in X-direction from the rotation axis, an additional Z-support is arranged preferably on the front side of the bed, in particular in its lower portion, wherein the toward protruding free end of the Z-slide is additionally supported at the bed through the additional Z-support.

c) Embodiments

Embodiments of the invention are subsequently described in an exemplary manner with reference to the drawing figure wherein:

FIG. 1: illustrates a turning machine according to the invention; and

FIG. 2: illustrates applications for the tool unit according to the invention viewed in Y-direction.

The configuration of the entire turning machine is apparent from the FIGS. 1a, b and 2a.

This is a horizontal bed turning machine 1 in which a head stock 24 sits on a horizontal top side at one end of an approximately cuboid bed 2, wherein the tool spindle 11 is supported in the head stock so that it is drivable in rotation, wherein the tool spindle includes a typical jaw chuck 26 at its face end for clamping a work piece 20 and driving it in rotation, wherein the work piece is supported at another end by a tail stock 27 which also sits on the topside of the bed.

The rotation axis of the tool spindle 11, the rotation axis 10, thus extends horizontally.

Two typical Z-supports 23a, b with prismatic cross-sections extend horizontally offset from one another on a topside of the bed in Z-direction, thus in a direction of the rotation axis 10, wherein the Z-slide 3 of the tool system is movable in Z-direction on the Z-supports, and possibly also the tail stock 27 can be movable.

On the topside of the Z-slide 3 an X-slide 4 is movable in X-direction, thus the horizontal transversal direction relative to the rotation axis 10, in order to be able to move the tool support 5 sitting on the X-slide with its tools towards a workpiece 20 for machining and so that it can be backed off again.

As illustrated in particular in FIGS. 1a and 1b the Z-silde 3 protrudes beyond the front side 2a of the bed 2 in order to provide a sufficient contact surface for the tool support 5 to be positioned offset from the rotation axis 10.

The free end 3a of the Z-slide 3 is supported at the bed 2 of the turning machine 11 through an additional Z-support 23c, wherein the additional Z-support is arranged with its front side at a level below the two Z-supports 23a, b arranged at the horizontal upper Z-support plane 25.

The tool support 5 at which a driven tool 9 and also plural stationary tool 8a, b are arranged is arranged on the X-slide 4 rotatable about the B-axis which extends parallel to the Y-direction and includes in this case a base plate 15 which is rotatably arranged about the B-axis on the X-slide 4 and from which two arms 14a, b protrude vertically which are offset in Z-direction, wherein the cross section of the arms viewed in Y-direction extend approximately in X-direction when the tool support 5 is in a normal position, thus oriented with the extension of the tool spindle 6 received therein in X-direction towards the work piece 20 or the rotation axis 10 as illustrated in FIGS. 1a, b and 2a.

Figure 2A:
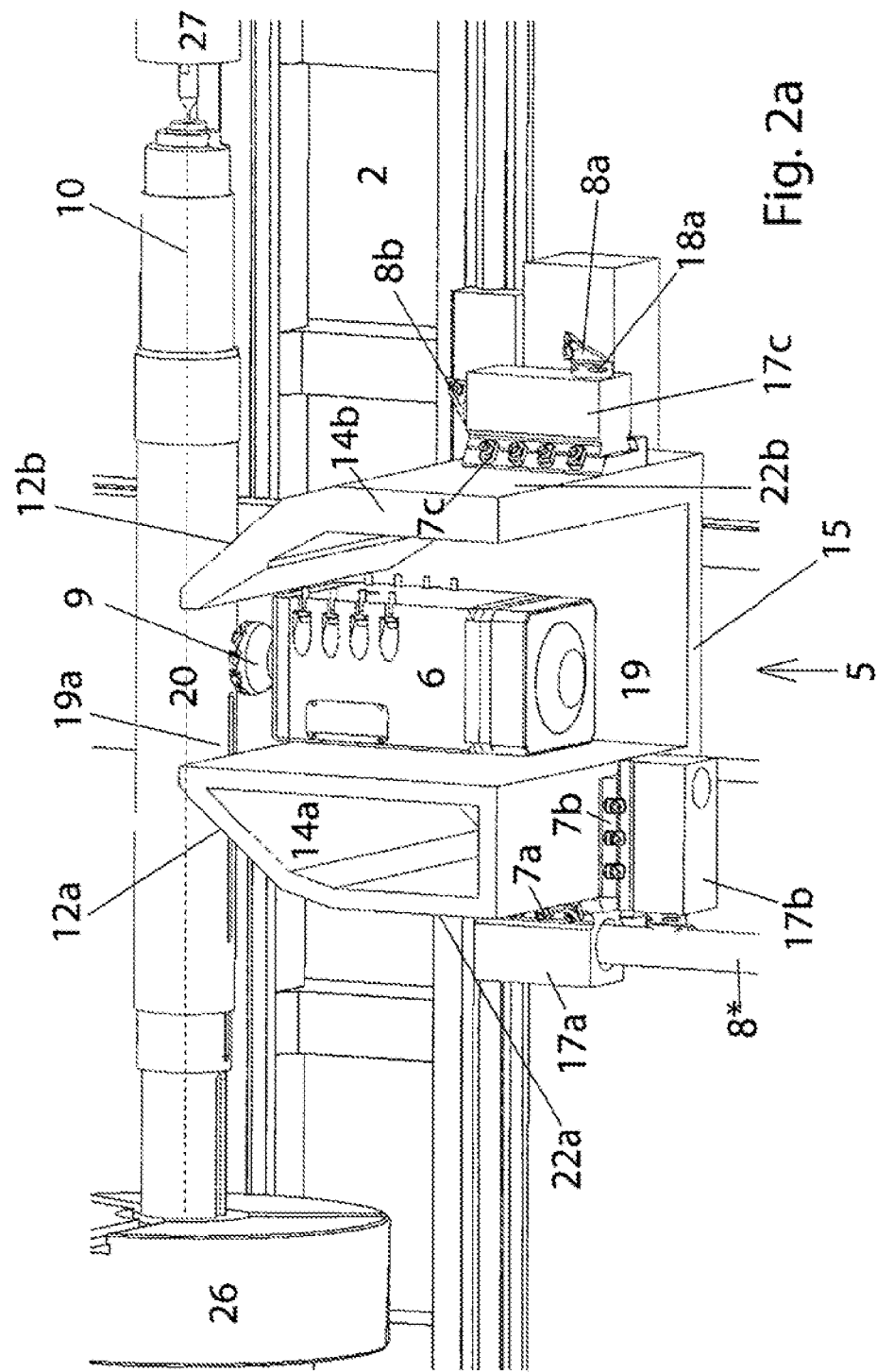

As illustrated best in their perspective views of FIG. 2a and following, the tool support 5 in top view, thus viewed in Y-direction, includes a tapered forward end oriented against the rotation axis 10 in the normal position, wherein the outer surfaces 22a, b of the two arms 14a, b, which extend parallel to one another in the rear portions transition into converging slanted surfaces 12a in their front portion.

While the arm 14a which is on the left side in FIG. 2 and oriented towards the chuck 26 is a hollow profile viewed in Y-direction with a straight outside oriented towards the other arm 14b, the other arm 14b is a massive profiled component, whose curvature corresponds to the curvature of the outer surface 22b/12b, wherein the non illustrated Y-supports for moving the tool spindle 6 in Y-direction are arranged at an inside of the other arm.

In the intermediary space 19 between the two arms 14a, b the tool spindle 6 is movably arranged in Y-direction at an arm 14a, wherein the rotation axis of the tool spindle extends horizontally and oriented towards the rotation axis in its normal position.

The intermediary space 19 tapers at the end oriented towards the rotation axis 10 to form a gap 19a, which is sized exactly so the front end of the tool spindle 6 is received therein which does not protrude beyond the tool support 5 either.

Figure 2B:
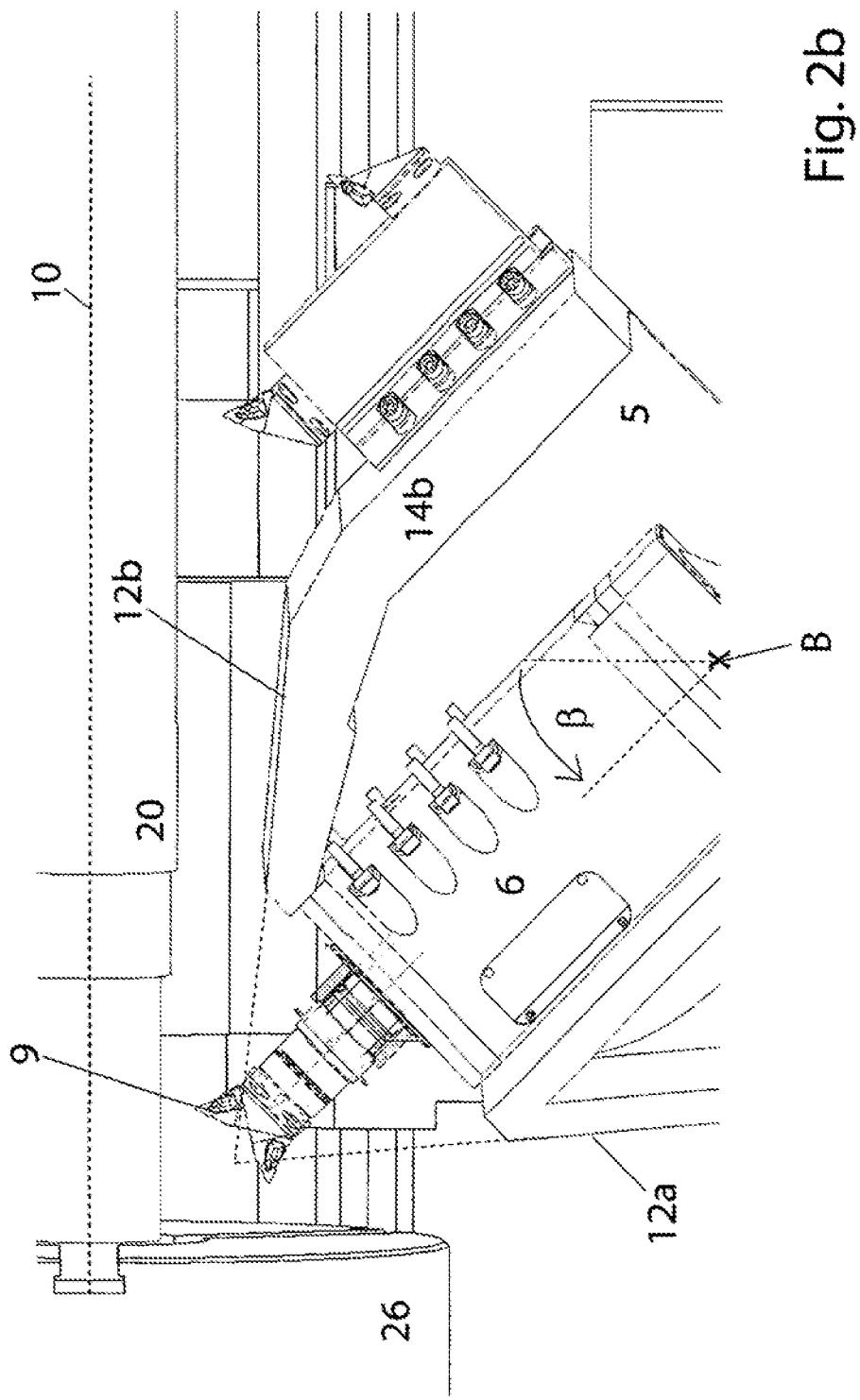

A driven tool 9, thus a mill is inserted into the tool receiver of the tool spindle 6, wherein the mill reaches the geometric intersection point of the slanted surfaces 12a, b of the support 5 or exceeds it depending on the length of the mill as apparent best in FIGS. 2b and 2c.

The feed lines for energy and control signals for driving the tool spindle 6, which are illustrated in FIGS. 2a and following only cut off at the tool spindle 8, are supplied from the topside of the fool support 5 in that an arcuate horizontally circumferential so called energy chain 22 is mounted on the free upper ends of the arms 14a, b, wherein the energy chain is supplied with energy through a boom which runs the energy conductors up from the lower portion of the turning machine.

This energy chain 22 is configured as evident from the lateral view in FIG. 1b to bend energy conductors with a defined bending radius, and not only in one, but in two curvature directions, so that an outer, open side 22a of the energy chain 22 that is arcuate in top view, the Y-direction, is oriented approximately to the front end of the support 5, thus the tool receiver of the tool spindle 6.

Besides the tool 9 that is drivable in rotation and which is arranged in the tool spindle 6 and which is movable in Y-direction like through X- and Z-slides 4,3 also in the remaining spatial directions, additional tool receivers 7a, b . . . are arranged at the arms 14a, b of the tools support 5 for receiving stationary tools 8 a, b, wherein the stationary tools are also permanently positioned at the tool support 5, thus in particular they are not movable in the Y-direction along the support which keeps design complexity low.

The tool receivers 7a, b, c are conventional prism supports with horizontal extensions, wherein a tool holder 17a, b, c is insertable into the tool receivers, wherein the tool holder in turn includes typically two receivers for two heads 18a, b protruding in different directions of the cuboid tool holder 17a.

Thus a tool receiver 7c is arranged on an outward oriented outer surface 22b of the profiled right arm 14b in the rear portion, wherein the tool holder 17c of the tool receiver 7c supports a receiver for tool heads 18a, b oriented forward towards the rotation axis 10, wherein tools 8a, b, in this case turning tools are included in the tool heads.

However at the analogous location of the other arm 14a, a tool receiver 7a is arranged at which a tool holder 17a is attached which includes a receiver that is oriented in opposite extension direction with respect to the receiver in the tool spindle 6 for the driven tool 9 and into which a stationary drilling rod 8* is inserted which protrudes beyond the rear end of the tools support 5, thus in its normal position away from the rotation axis.

Furthermore another tool receiver 7b is provided on the rear outside of the arm 14a, wherein the extension of the tool receiver 7b is typically parallel to the rotation axis 10 and wherein a tool holder 17b is received in the tool receiver, wherein the tool holder does not carry any tool receiver and thus no tool for the time being.

FIGS. 2a through 2f typically illustrate different machining situations and thus different rotational positions of the tool support 5 typically in a top view, the Y-direction or in a slightly perspective view relative to the Y-direction.

FIG. 2a illustrates the tool support 5 in its normal position, thus oriented in X-direction with the rotation axis of the tool spindle 6, so that the driven tool 9a inserted therein can perform a milling operation in the enveloping surface of the stationary workplace 20 through moving the fool spindle 6 in Y-directions, thus along the Y-supports 16a.

In FIG. 2b the tool support 5 is pivoted by a positive pivot angle +β counterclockwise about the B-axis on the X-slide 4 so that the outward oriented slanted surface 12b of the right arm 14b of the tool support 5 is already disposed almost parallel to the rotation axis 10, the Z-direction.

Thus, the driven tool 9 protrudes at a slant angle relative to the rotation axis 10 and can perform a milling operation at the circumference of the work piece 20. Thus, also very close to the end of the work piece 20 clamped in the chuck 26, since the support can move very far into the inner angle between the face of the chuck 26 and the enveloping surface of the workpiece 20, due to the slanted surfaces 12a, b tapering towards one another at a slant angle.

When the tool support 5 is rotated slightly further in this direction and when the pivot angle β is increased until the slanted surface 12b with its transition into the outer surface 22b is arranged closer to the rotation axis 10 than with its front end, a turning operation can be performed instead at the workpiece 20 with one of the tools 8a, b which are arranged in the fool receiver 7c in the rear portion of the outer surface 22b, dependent on actual the pivot angle β.

Since in particular, the tool 8a is mounted very far at the rear corner of the support 5, work can be performed in particular with this tool 8a also very close to the right end of the workpiece 20 which is supported e.g. by the tailstock 27.

FIG. 2e illustrates a further rotation of the support 5 in counter-clockwise direction until the rotation axis of the headstock 6 is parallel to the rotation axis 10.

The tool 8a then protruding in X-direction can also longitudinally turn the enveloping surfaces of the workpiece 20.

Figure 2D:
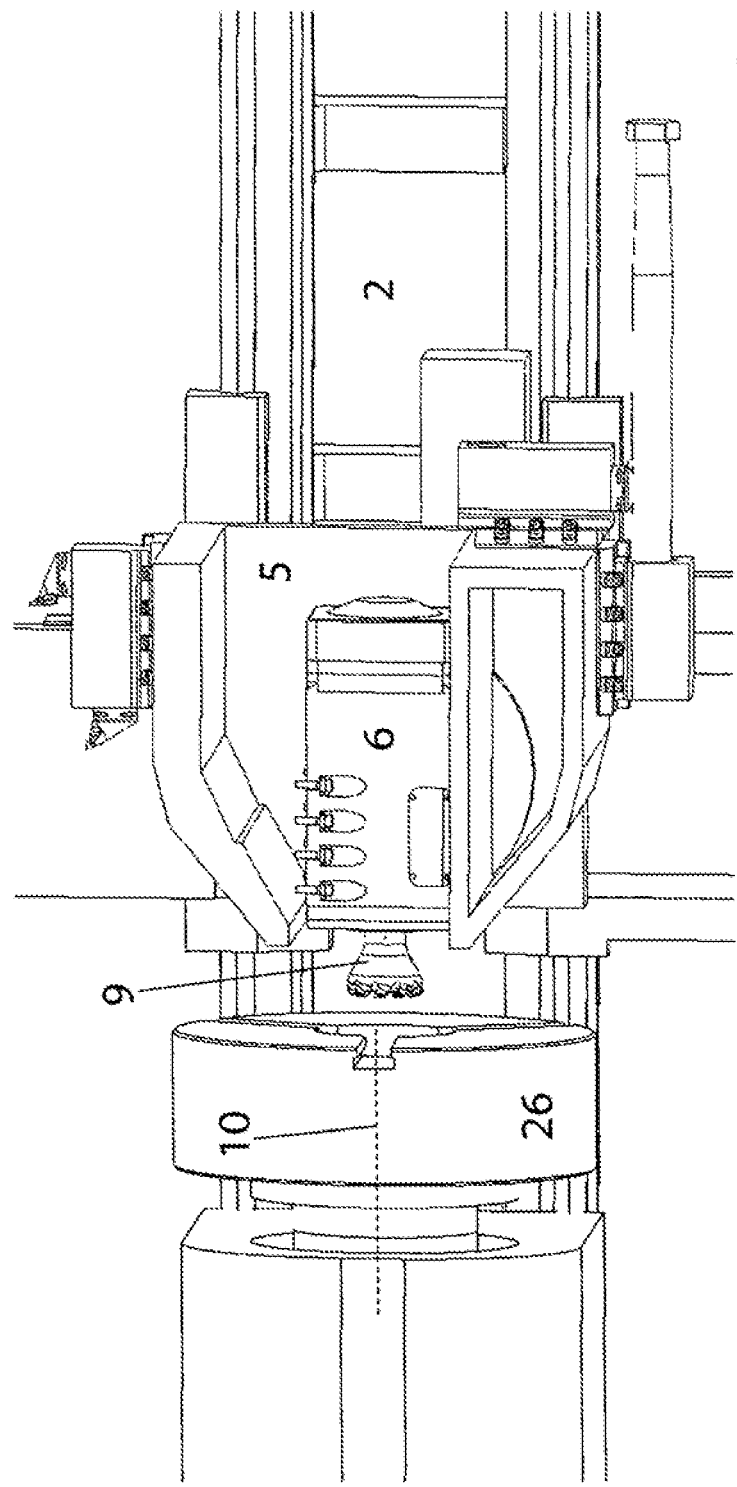

FIG. 2d illustrates the tool support 5 in the same rotation position about the B-axis, however moved in X-direction far enough so that the rotation axis of the tool spindle 6 is arranged on the rotation axis 10.

The driven tool 9 which is a mill is thus illustrated oriented towards the jaw chuck 28 with no workpiece illustrated therein.

A flange shaped work piece that is supported in the chuck 28 on one side can be machined this way on its free face by the driven tool 9 of the tool support 5.

FIG. 2f illustrates a support 5 that is pivoted even further namely relative to the normal position by more than 90° counterclockwise by the pivot angle +β, which can be necessary when the turning tool 8a that is inserted at the right rear end of the support 5 shall be used e.g. for turning a shoulder for the workpiece 20.

Figure 2G:
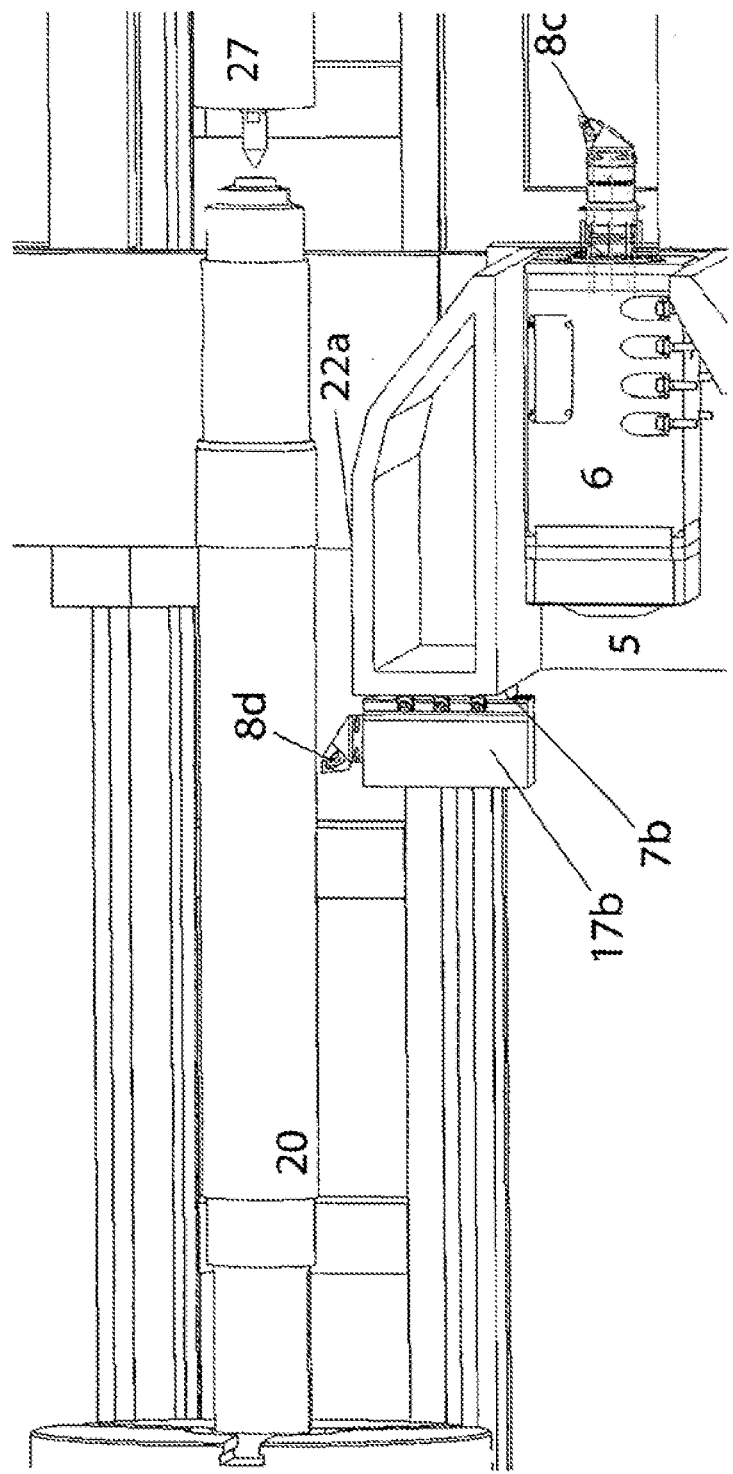

FIGS. 2g and 2h on the other hand illustrate a support 5 that is rotated from the normal position info an opposite direction, thus by a negative pivot angle −β of −90°, thus in which the rotation axis of the tool spindle 6 in turn extends in parallel to the rotation axis 10, however with a tool inserted into the tool spindle 6 so that it is oriented towards the tail stock 27.

FIG. 2g illustrates a turning tool 8b inserted in the tool receiver 7b on the backside of the arm 14a of the support 5 analogous to the illustration of FIGS. 1a and 2a, wherein the turning tool protrudes beyond the outer surfaces 22a of the arm 14a and is configured to longitudinally turn the workpiece 20.

The drilling rod 8 and the tool holder 17a which supports the drilling rod are dismounted for this purpose from the outer, open side 22a, since the support 5 could otherwise not move close enough to the work piece 20.

Contrary thereto in FIG. 2h in particular the drilling rod 8* is mounted through the tool holder 17a at the outer, open side 22a and moved far enough through the X-slide in the X-direction, so that the drilling rod 8* is arranged approximately on the rotation axis 10 and thus a workpiece that is clamped in the jaw chuck 26 and not illustrated in FIG. 22a and driven in rotation by the chuck 26 can be provided with a central bore hole.

In this case the tool holder 17b is dismounted from the backside of the arm 14a.

FIG. 2i illustrates the special situation that a stationary tool is inserted in the tool spindle 6 which is configured to be driven in rotation, in this situation a turning tool 8c as already illustrated in FIGS. 2f and 2g.

FIG. 2*i* illustrates the application. Since the support 5 tapers towards its front end and the turning tool 8*c* inserted in the tool spindle 6 protrudes beyond the intersecting point of the slanted surfaces 12*a, b* so that the tool can also be used in inner angles like e.g. at the face of the work piece 20 even adjacent to the tip of the tail stock which would not be possible due to the lower protrusion when the fool is arranged at one of the other tool receivers 7*a, b* . . . .

These applications illustrate that very high flexibility of the turning machine and thus eventually a very high price/performance ratio, can be achieve with rather low design complexity, thus Y-movability of the only one driven tool spindle 6 and otherwise fixated tool receivers 7*a, b* . . . on a support that is pivotable about the B-axis.

| Reference Numerals and Designations | |
|---|---|
| 1 | Turning Machine |
| 2 | Bed |
| 2a | Front Side |
| 3 | Z-Slide |
| 3a | Free End |
| 4 | X-Slide |
| 5 | Support Tool |
| 6 | Tool Spindle |
| 7a, b | Tool Receiver |
| 8a, b, . . . | Stationary Tool |
| 8* | Drilling Rod |
| 9 | Driven Tool |
| 10 | Rotation Axis |
| 11 | Work Piece Spindle |
| 12a, b | Slanted Surface |
| 13 | Angle |
| 14a, b | Arm |
| 15 | Base Plate |
| 17a, b, c | Tool Holders |
| 18a, b | Tool Head |
| 19 | Intermediary Space |
| 19a | Gap |
| 20 | Work piece |
| 21 | Control |
| 22 | Energy Chain |
| 22a, b | Open Side |
| 23a, b | Z-Support |
| 24 | Head Stock |
| 25 | Z-Support Plane |
| 26 | Jaw Chuck |
| 27 | Tail Stock |
| β | Pivot Angle |
| X, Y, Z | Directions |
| B, C | Rotation Axes |

The invention claimed is:

1. A turning machine (1), comprising:
 a workpiece spindle (11) drivable in rotation with a controlled C-axis;
 a bed (2);
 a Z-slide (3) movable in a direction of a rotation axis (10); and
 a X-slide (4) movable on the Z-slide (3),
 a tool support (5) is arranged directly on the X-slide (4), so that the tool support is pivotable about a B-axis, and
 a driven tool spindle (6) is arranged at the tool support (5), so that the tool spindle is movable in a Y-direction along the tool support (5),
 wherein additional stationary tool receivers (7*a,b* . . . ,) for non rotating tools (8*a, b*) are provided at the tool support (5).

2. The turning machine (1) according to claim 1, wherein the tool spindle (6) is drivable in the Y-direction along the tool support (5) in a linear manner.

3. The turning machine (1) according to claim 1, wherein, at the tool support (5) the additional stationary tool receivers (7*a,b,* . . . ) are positioned in a fixated manner in the Y-direction.

4. The turning machine (1) according to claim 1, wherein the tool receivers (7*a, b*) for non rotating tools (8*a, b*) are arranged at the tool support (5) on a side oriented away from the tool spindle (6).

5. The turning machine (1) according to claim 1, wherein tools (8*a, b*) inserted into the receivers (7*a, b*) for stationary tools (8*a, b* . . . ) protrude at an angle with respect to the tool spindle (6) or opposite with respect to the tool spindle viewed in Y-direction.

6. The turning machine (1) according to claim 1, wherein the tool support (5) has a contour viewed in y-direction, wherein the outer surfaces of the contour includes slanted surfaces (12*a, b*) tapering into a point in forward direction, thus towards the workpiece (20) or towards the driven tool (9), wherein the slanted surfaces are arranged at an angle (13) of less than 70° to 80° relative to one another.

7. The turning machine (1) according to claim 1, wherein the tool support (5) viewed in Y-direction includes at least one arm (14*a*) tapering into a point in forward direction towards the workpiece (20), thus in a direction towards the driven tool (9) to be inserted.

8. The turning machine (1) according to claim 1, wherein the tool support (5) includes at least two arms (14*a, b*) offset from one another and protruding in the Y-direction from a base plate (15), wherein the Y-support (16*a, b*) for the tool spindle (6) is arranged at the one arm (14*b*) on a side oriented towards the other arm (14*a*).

9. The turning machine (1) according to claim 8, wherein the one arm (14*a*) has a hollow profile viewed in the Y-direction and the other arm (14*b*) is a massive profiled arcuate component.

10. The turning machine (1) according to claim 9, wherein the tool receivers (7*a, b*) for stationary tools (8*a, b*) are arranged at the outsides of the arms (14*a, b*) at one or both outer slanted surfaces (12*a, b*) with tools (8*a, b*) oriented forward or away from the slanted surfaces (12*a, b*) and also at a rear end of the outer surfaces (22*a, b*) with tools (8*a, b*) protruding in opposite direction to the driven tool (9) in the tool spindle (6).

11. The turning machine (1) according to claim 1, wherein the tool receivers (7*a, b*) for the stationary tools (8*a, b*) are universal receivers for receiving tool holders (17*a, b*) from which tool heads (18*a, b*) protrude in different directions.

12. The turning machine (1) according to claim 1, wherein the tool spindle (6) is configured for inserting non rotating tools (8*a, b*), in particular turning tools.

13. The turning machine (1) according to claim 1, wherein the B-axis and Y-axis are numerically controlled by a control (21) of the turning machine (1).

14. The turning machine (1) according to claim 1, wherein the tool support (5) is pivotable about the B-axis by at least +/−110°.

15. The turning machine (1) according to claim 1, wherein one of the stationary tools (8*a, b*), in particular the tool (8*) protruding in rearward direction and in opposite direction to the tool spindle (6) is a drilling rod.

16. The turning machine (1) according to claim 1, wherein the energy supplies to the tool spindle (6) in the tool support (5) in the intermediary space (19) on a side oriented away from the Y-support between two arms (14*a, b*).

17. The turning machine (1) according to claim 1, wherein the energy supply to the tool spindle (6) is provided from the upper side of the tool support (5).

18. The turning machine (1) according to claim 1, wherein an energy chain (22) that is arcuate viewed in Y-direction is arranged on the upper side of the tool (5), so that an angle range of the energy chain corresponds to the pivot range of the tool support (5).

19. The turning machine (1) according to claim 1, wherein the Z-supports (23*a, b,*) for the slide (24) are arranged on a top side of the bed (2) and in particular an additional support (23*c*) for the Z-slide (3) is provided on a front side (2*a*) of the bed (2), wherein a free end (3*a*) of the Z-slide (3) protruding in viewing direction is supported on the additional support.

20. The turning machine (1) according to claim 8, wherein a front end of the tool spindle (6) is arranged in a gap (19*a*) between front ends of the two arms (14*a, b*) and therefore in particular fills the gap viewed in the Y-direction.

21. The turning machine (1) according to claim 6, wherein the tool spindle (6) is positioned far enough forward in the tool support (5), so that the driven tool (9) inserted therein at least reaches the geometric intersection point of the slanted surfaces (12*a, b*), in particular exceeds it.

22. The turning machine (1) according to claim 6, wherein the tool spindle (6) viewed in the Y-direction, is positioned far enough forward in the tool support (5), so that a driven tool inserted therein at least meets, in particular exceeds the geometric intersection point of the slanted surfaces (12*a, b*).

* * * * *